Figure 1:
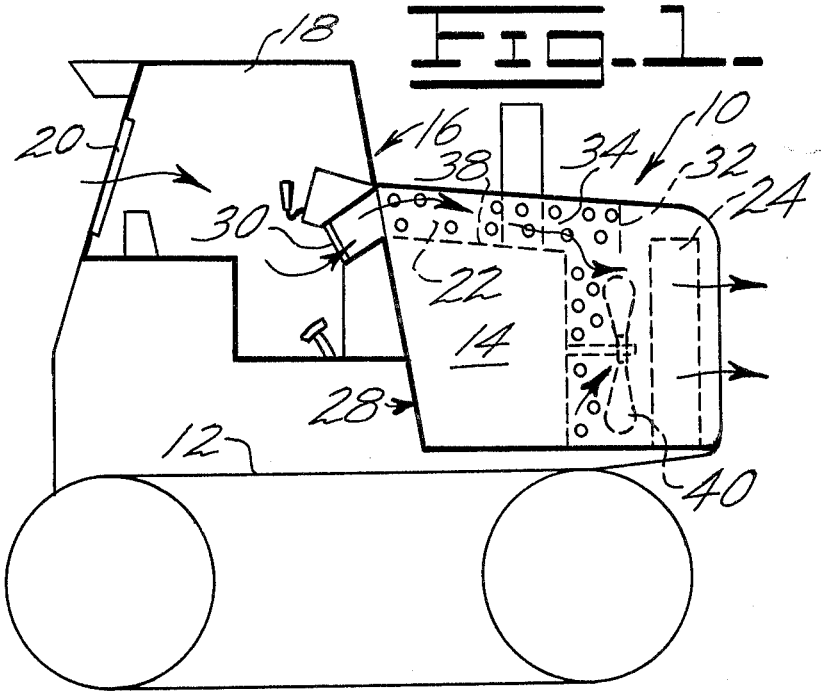
Figure 2:
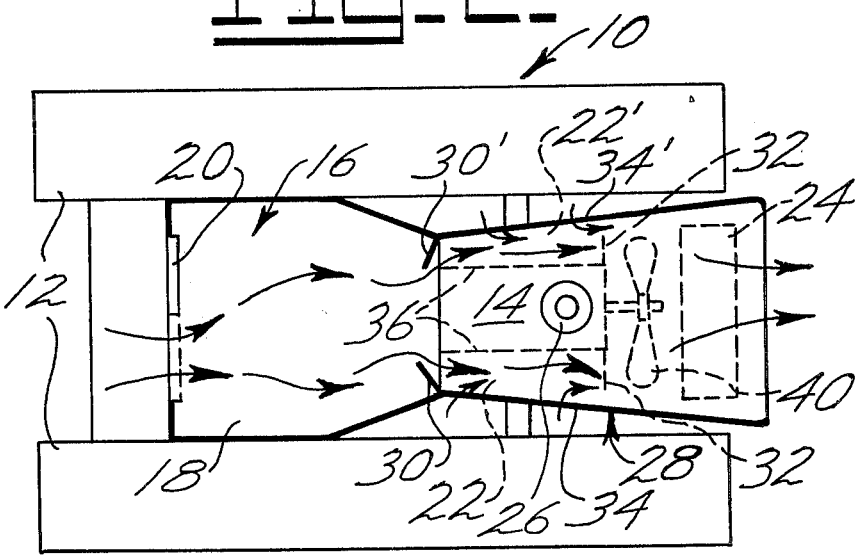
Figure 3:
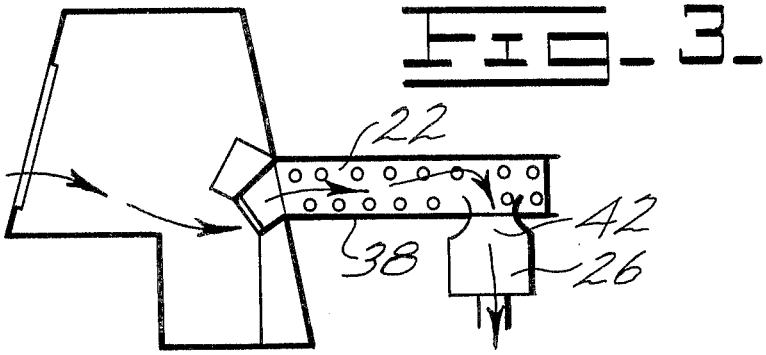
Figure 4:
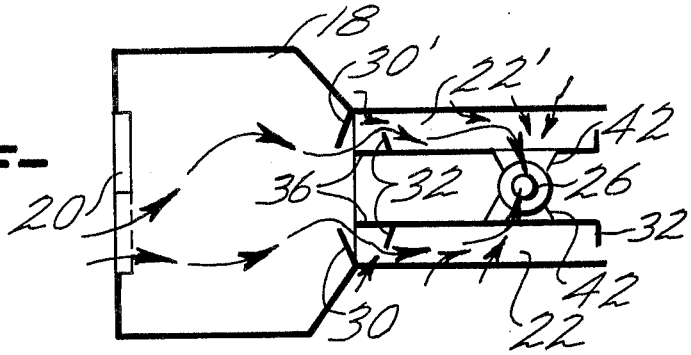
Figure 5:
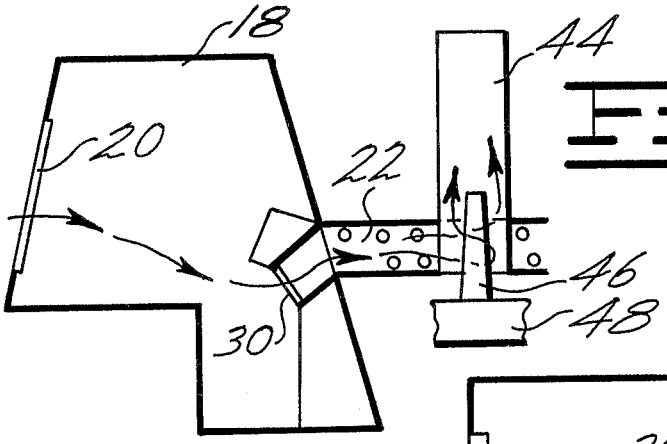
Figure 6:
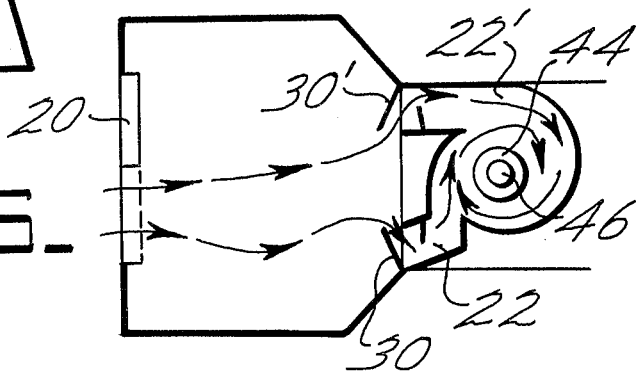

United States Defensive Publication [19] (H) [11] T986,006

Simmons [43] Sep. 4, 1979

[54] AIR CIRCULATION SYSTEM/CAB

[75] Inventor: Gerald P. Simmons, Washington, Ill.

[73] Assignee: Caterpillar Tractor Co., Peoria, Ill.

[21] Appl. No.: 973,650

[22] Filed: Dec. 26, 1978

[51] Int. Cl.[2] ..... B60H 1/00

[52] U.S. Cl. ..... 98/2; 98/2.18

[57] ABSTRACT

In an air circulating system of a work vehicle having an operator's cab, a manifold and a radiator, a plenum is used for controllably passing an air stream from outside the cab through the cab to a radiator and manifold.

1 Claim, 2 Sheets Drawing,

6 Pages Specification

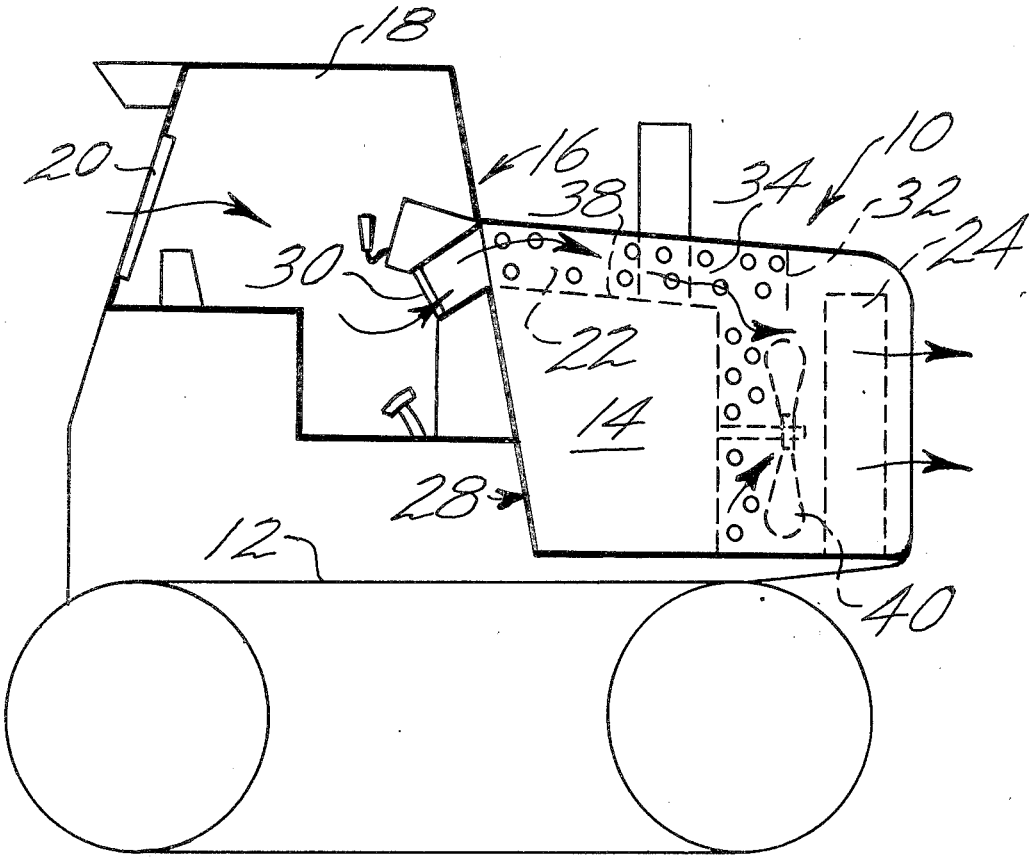

The file of this unexamined application may be inspected and copies thereof may be purchased (849 O.G. 1221, Apr. 9, 1968).